(12) United States Patent
Wego

(10) Patent No.: US 7,058,073 B2
(45) Date of Patent: Jun. 6, 2006

(54) ARRANGEMENT AND METHOD FOR TRANSMITTING DATA OVER A TDM BUS

(75) Inventor: Arild Wego, Lier (NO)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 911 days.

(21) Appl. No.: 10/000,038

(22) Filed: Dec. 4, 2001

(65) Prior Publication Data

US 2002/0067737 A1    Jun. 6, 2002

(30) Foreign Application Priority Data

Dec. 5, 2000    (NO) ................................. 20006185

(51) Int. Cl.
*H04J 3/06* (2006.01)

(52) U.S. Cl. ............... 370/442; 370/458; 370/503; 370/528; 375/363

(58) Field of Classification Search ............... 370/216, 370/217, 442, 458, 503, 504, 505, 506, 508, 370/512, 514, 520, 528, 559; 375/354, 360, 375/363, 368
See application file for complete search history.

(56) References Cited

U.S. PATENT DOCUMENTS 5,088,089 A * 2/1992 Gingell et al. ............... 370/363
5,483,528 A * 1/1996 Christensen ................. 370/263
5,544,324 A   8/1996 Edem et al. ................. 370/503
6,072,796 A * 6/2000 Christensen et al. ........ 370/379

OTHER PUBLICATIONS

ECTF; Hardware Compatibility Specification: CT Bus, revision 1.0.
ITU-T Recommendation G.705(Oct. 2000); Characteristics of plesiochronous digital hierarchy (PDH) equipment functional blocks.

* cited by examiner

*Primary Examiner*—Dang Ton
*Assistant Examiner*—Shick Hom

(57) ABSTRACT

The invention relates to a TDM backplane bus system, in which a Frame Synchronisation signal is developed from an external communication signal, a data clock signal is produced from a free running clock oscillator independent of the FS signal, to select the frequency of the clock signal so that the number of periods within a frame is always at least one more than the number of timeslots required, to synchronise the FS signal to the CLK signal, and supply this synchronised Frame Synchronising signal (FS-S) to the TDM-bus. Further, the exceeding period(s) is identified by introducing a carry bit in the timeslot counters, the carry bit being set each time the counter(s) exceeds the number of timeslots on the TDM bus.

2 Claims, 4 Drawing Sheets

ARRANGEMENT AND METHOD FOR TRANSMITTING DATA OVER A TDM BUS

TECHNICAL FIELD

The invention is applicable in the data- and telecommunication field. In particular this invention describes an improved synchronisation and clocking solution related to data communication over a TDM backplane bus.

TECHNICAL BACKGROUND

A traditional TDM-bus application consists of a data bus (DATA) (usually 8 bits), a data clock (CLK) and a frame synchronisation signal (FS). The time domain is divided into frames where each frame has a fixed duration (usually 125 μs). A frame synchronisation signal indicates the start of each frame and has a period as long as the frame duration. The frame synchronisation signal and the data clock comes from a synchronisation master source and are the timing master signals for all transmitters and receivers that are communicating via the TDM-bus. The frames are divided into a fixed number (N) of timeslots (TS) identified by local timeslot counters (CNT). The local timeslot counters are reset by the FS signal. In each TS data may be transmitted from a transmitter to a receiver using time division multiplexing (TDM).

The synchronisation Master regenerates the frame synchronisation signal from an incoming data stream containing a synchronisation pattern. The data clock is phase locked to the frame synchronisation signal to avoid bit glips during the transmission.

In most TDM-bus applications it is possible to configure more than one synchronisation source and more than one synchronisation master. If the active synchronisation source or the active synchronisation master fails, another will take over according to a priority list. If this happens it is important that the switch over from one data clock to another is done in a controlled way so that no bit faults appear. This is usually solved by phase locking all the synchronisation masters to the active synchronisation master, and at switch over, gradually phase lock the new synchronisation master data clock to the active synchronisation source.

The "H.110 Hardware Compatibility Specification: CT Bus" standard is an example of such a TDM-bus solution as described above.

The problems encountered with this conventional solution are:
1. In a system with a large number of TS within a frame, the data speed increases and the phase locking of the data clock becomes more complicated. Jitter, stability and delay problems introduced in the phase locked loop (PLL) limits the maximum data rate.
2. A controlled switch over from one data clock to another (i.e. if a synchronisation master fails), requires a slow PLL (low bandwidth loop filter) because the data clock must gradually switch over from one synchronisation source to another to avoid bit glips.
3. A slow PLL is complicated to implement in hardware (especially in integrated circuits), and jitter, stability and delay problems become greater the slower the PLL is.

OTHER PRIOR ART

In U.S. Pat. No. 5,544,324 is disclosed a data communication system, such as local area network, provided with the capability of transmitting isochronous data. Each node includes a free running clock that determines the length of the frames and timeslots. Ideally the clock's frequency is equal to the network frequency. In reality it can be greater or less than the network frequency. This results in a local frame length that departs from the frame length in the signals on the network. To compensate for the variations between local and network frame lengths, timeslots are added or subtracted in some of the frames.

BRIEF DESCRIPTION OF THE INVENTION

The object of the present invention is to provide an arrangement and method for transmitting data over a TDM bus that allows a faster data transfer while maintaining a controlled switch over from one synchronisation master to another in case the current master should fail.

This object is achieved in an arrangement and method according to the present invention, in which the use of a phase locked data clock is avoided. Said clock is replaced with a free-running clock running at an over frequency in relation to the frame length. However, the exact scope of the invention is as defined in the appended patent claims.

DETAILED DESCRIPTION OF THE INVENTION

The invention will now be described in detail in reference to the appended drawings, in which.

Figure 1:
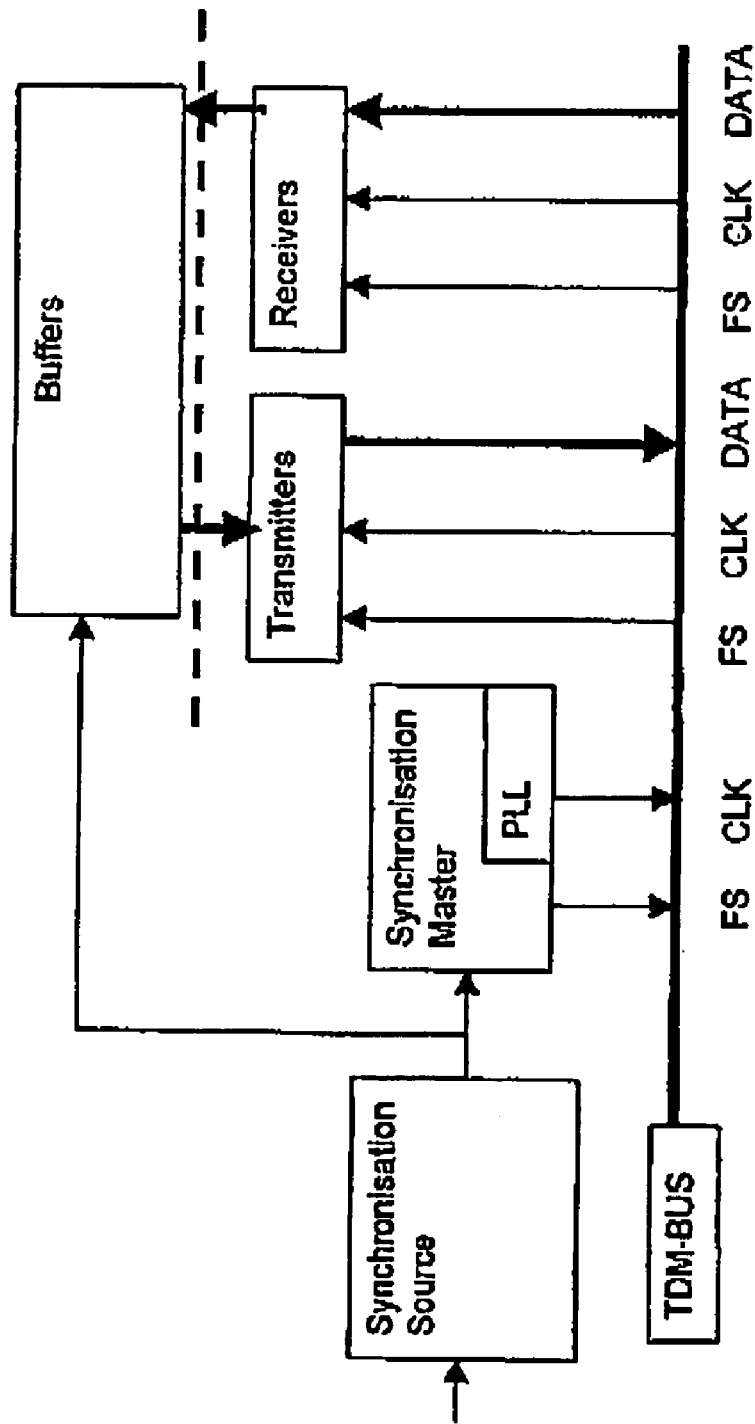
FIG. 1 shows a simplified block diagram of a TDM bus arrangement according to prior art.

In FIG. 1 is shown a prior art communication system, with an internal TDM back-plane bus. The system exchanges data with an outside high bit-rate network typically a PDH network. The PDH network is merely an example on a possible external connection; other network standards may be just as usable, and the type of external network has no influence on the present invention. However, a description of the PDH network can be found in ITU-T recommendation G.705 (10/00)-Characteristics of Plesiochronous Digital Hierarchy (PDH) equipment functional blocks. October. 2000.

The application includes transmitters and receivers communicating with the external network, typically with buffers separating the TDM bus from the PDH network serial interfaces.

The internal communication takes place on a TDM bus with a Synchronisation Master supplying the Frame Synchronisation signals and a clock oscillator phase locked to these FS signals, as explained earlier. The SM develops the FS signals from the PDH network in order to get the application synchronised with the incoming signals.

Figure 2:
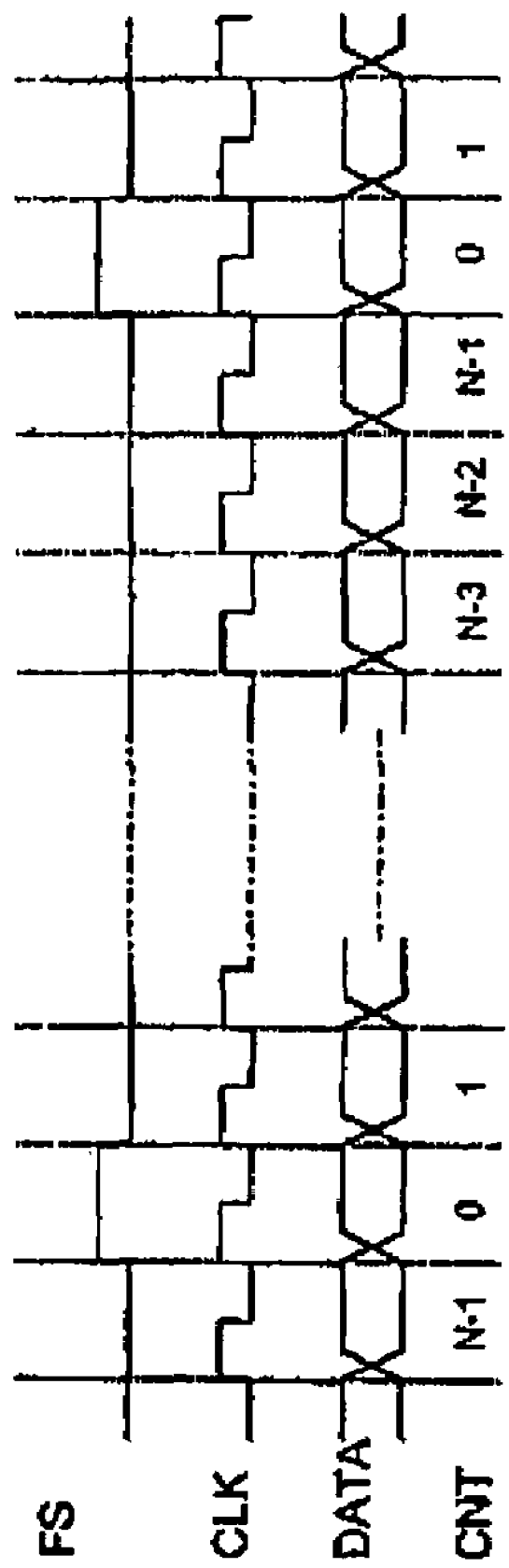
FIG. 2 shows a timing diagram for the TDM bus arrangement in FIG. 1.

FIG. 2 visualises the timing between the various signals. The FS signal is synchronised to the outside data stream, and the clock signal is in sync with the FS signal due to the PLL. Transmitters and receivers include timeslot counters allowing them to send/receive in the correct timeslot. In the figure CNT indicates the identification (numbering) of the individual timeslots.

However, as mentioned above (item 1 and 3), this solution has its drawbacks, and it is desirable to eliminate the PLL in the synchronisation master block in FIG. 1.

Figure 3:
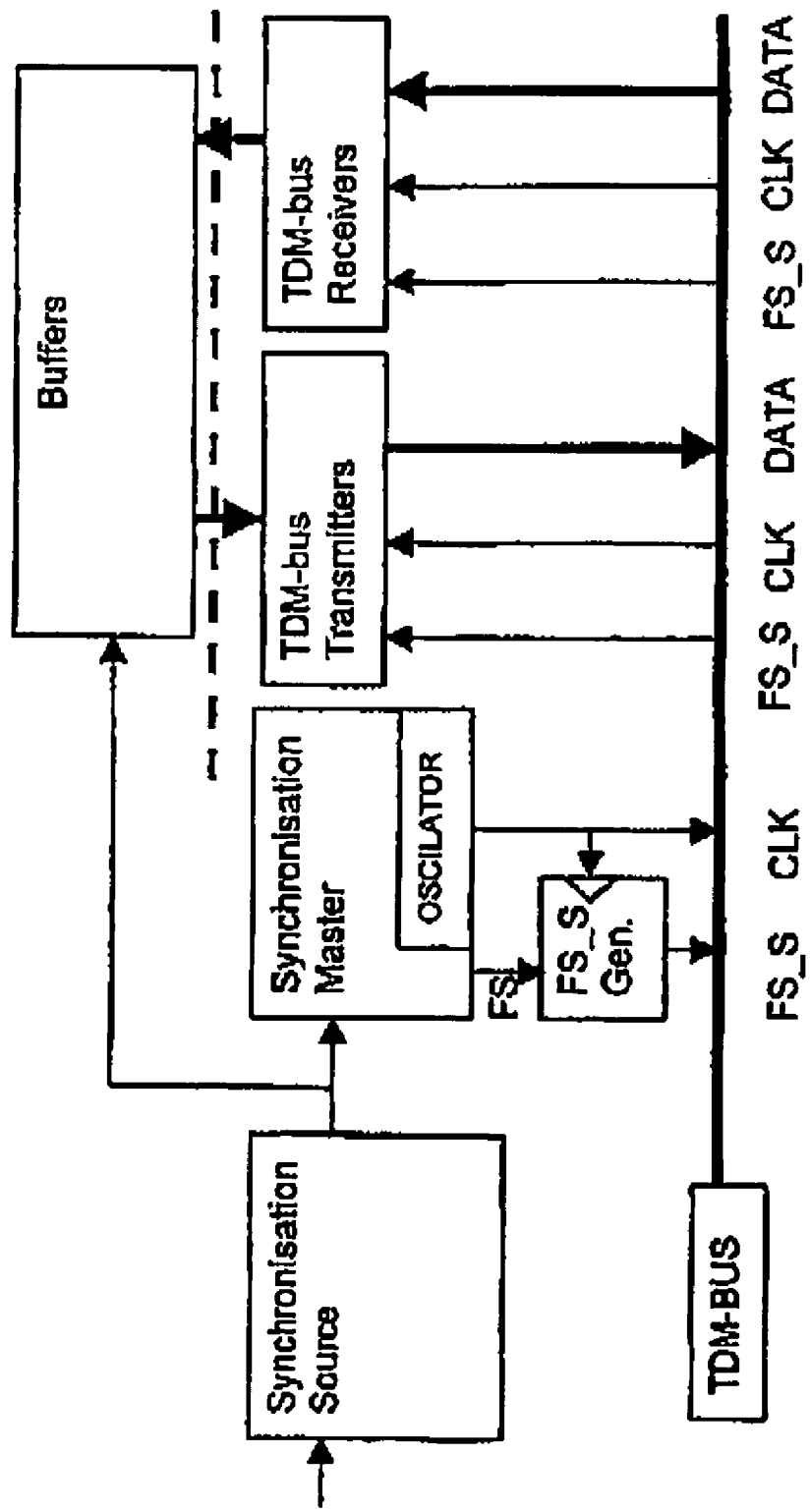
FIG. 3 shows a block diagram of a TDM bus arrangement according to the present invention, including a free running data clock.

We will now turn to FIG. 3 that shows a TDM bus system constructed according to the present invention. Instead of the PLL a free-running data clock coming from a stable oscillator independent of the frame synchronisation signal is introduced. In a traditional TDM system this will lead to bit faults because the number of clock periods within a frame will not be exactly fixed from frame to frame, but by doing some modifications, the bit faults can be eliminated:

1. Select the frequency of the data clock oscillator so that the number of periods within a frame is always at least one more than the number of timeslots required. (This results in a dummy time period with no data content within each frame.)
2. The timeslot counter identifying each timeslot must be modified to also identify the dummy time period. This may be done by introducing a carry bit, which is set each time the counter exceeds N (the number of timeslots on the TDM bus).
3. The timeslot counter must be reset by the frame synchronisation signal so that the first timeslot comes on a known time right after the frame synchronisation signal, and so that the dummy time period is at the end of the frame after all the timeslots have been transmitted.
4. The frame synchronisation signal must be synchronised (FS_S) to the free-running independent data clock to obtain synchronism between the involved signals.
5. The problem mentioned above, getting a controlled switch over from one data clock to another, is solved by always performing switch over from one synchronisation master to another during the dummy time period. During this period there is no data transmission so no bit glips will occur.

Figure 4:
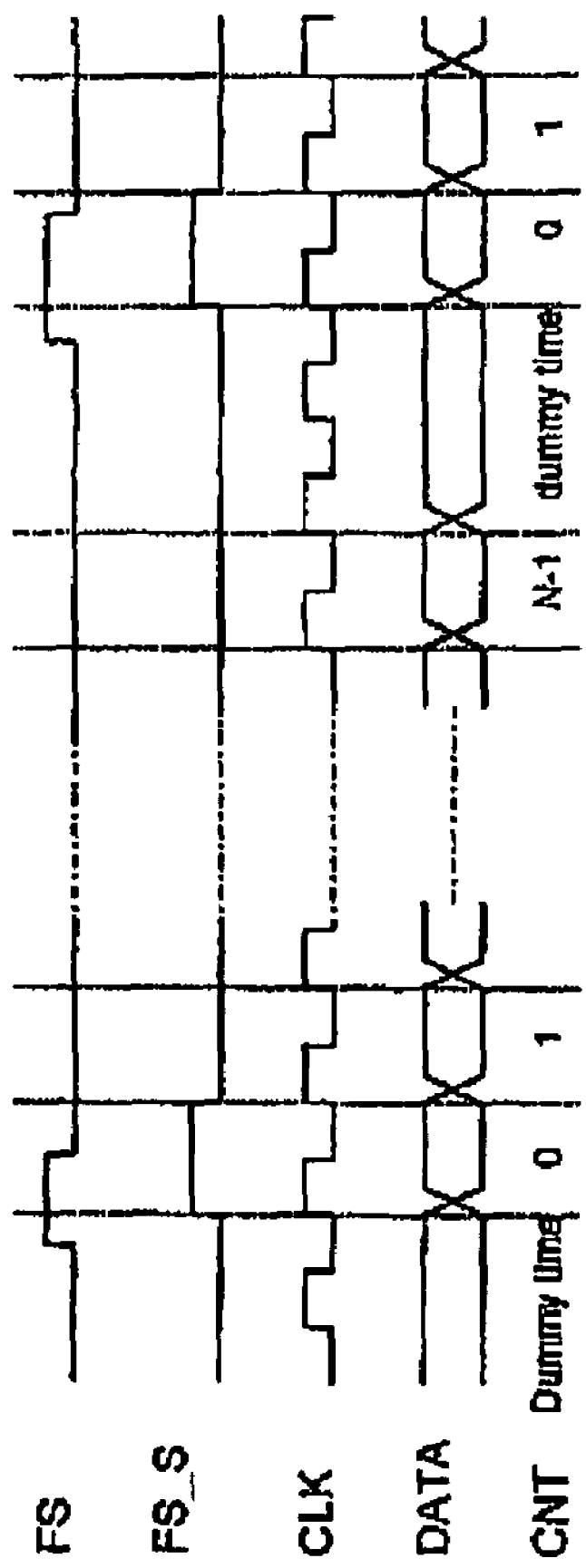
FIG. 4 shows a timing diagram for the various signals in the inventive TDM bus arrangement shown in FIG. 3.

In this system, the local free running oscillator may not be coincident with the signals on the external network, but the two signals may vary in phase, as indicated on FIG. 4 (the oscillator is lagging by 45°) However, this is a minor problem that is easily solved, e.g. by introducing a delay in the buffers.

Advantages

The advantages of the proposed solution are:
1. Jitter-, stability- and delay problems introduced in the PLL in FIG. 1 are eliminated by replacing the PLL with a stable free running oscillator as indicated in FIG. 3.
2. Synchronisation switchover conditions are simplified.
3. Complicated PLL design is eliminated
4. No variance detection between reference and local clock as described in U.S. Pat. No. 5,544,324, Date of Publication Aug. 6, 1996; "Network for transmitting isochronous source data using a frame structure with variable number of time slots to compensate for timing variance between reference clock and data rate." is needed.
5. No frame length adjustment as described in U.S. Pat. No. 5,544,324, Date of Publication Aug. 6, 1996; "Network for transmitting isochronous source data using a frame structure with variable number of time slots to compensate for timing variance between reference clock and data rate." is needed.

Broadening

The invention might be used as a modification of the H.110 standard ECTF; Hardware Compatibility Specification: CT Bus, 1996, 1997.

[1] ECTE; Hardware compatibility Specification: CT Bus, revision 1.0, 1996, 1997

[2] ITU-T Recommendation G.705 (10/00); Characteristics of plesiochronous digital hierarchy (PDH) equipment functional blocks. (October, 2000)

The invention claimed is:

1. An arrangement in a communication system including a TDM bus, a number of transmitters and receivers connected to said bus, at least one synchronization master developing Frame Synchronization signals, a stable oscillator supplying a free-running data clock, and a timeslot counter in each transmitter/receiver, wherein a free running data clock frequency is selected to give a number of periods within a frame that is always at least one more than a number of timeslots required, the periods that exceed the number of timeslots required constituting a dummy period, wherein each timeslot counter is adapted to identify the dummy period by introducing a carry bit, which is set each time the timeslot counter exceeds the number of timeslots required; and the frame synchronization signals are synchronized to the free-running data clock, wherein a switch over to another synchronization master takes place during the dummy period if the active synchronization master fails.

2. A method for synchronizing a Frame Synchronization (FS) signal and a data clock signal (CLK) in a TDM-bus system, said system including a number of transmitters and receivers connected to said bus, at least one synchronization master developing frame synchronization signals, a stable oscillator supplying a free running data clock, and a timeslot counter in each transmitter/receiver, the method comprising the steps of:

developing the FS signal from an external communication signal;

producing the CLK signal from a stable oscillator independent of the FS signal;

selecting a frequency of said clock signal (CLK) so that a number of periods within a frame is always at least one more than the number of timeslots required, the periods exceeding this number constituting a dummy period, wherein a carry bit is introduced in the timeslot counters to identify the dummy period, the carry bit being set each time the counters exceed the required number of timeslots on the TDM bus;

synchronizing the FS signal to the CLK signal; and supplying the synchronized FS signal to the TDM-bus, wherein the system will switch over to another synchronization master during said dummy period if an active synchronization master fails.

* * * * *